(12) United States Patent
Howard et al.

(10) Patent No.: US 7,529,723 B2
(45) Date of Patent: May 5, 2009

(54) MULTI-TIERED STRUCTURE FOR FILE SHARING BASED ON SOCIAL ROLES

(75) Inventors: Mark Anthony Howard, Miami, FL (US); Ian Emery Smith, San Francisco, CA (US); Trevor Frederick Smith, San Francisco, CA (US)

(73) Assignee: Xerox Corporation, Norwalk, CT (US)

( * ) Notice: Subject to any disclaimer, the term of this patent is extended or adjusted under 35 U.S.C. 154(b) by 398 days.

(21) Appl. No.: 10/735,962

(22) Filed: Dec. 15, 2003

(65) Prior Publication Data

US 2005/0131871 A1    Jun. 16, 2005

(51) Int. Cl.
*G06F 17/30* (2006.01)

(52) U.S. Cl. .................................. 707/1; 707/3; 707/10

(58) Field of Classification Search ................ 707/1, 707/3–5, 10, 100, 102, 104.1, 200; 709/201, 709/200, 203; 705/52
See application file for complete search history.

(56) References Cited

U.S. PATENT DOCUMENTS

| | | | |
|---|---|---|---|
| 6,260,040 B1 * | 7/2001 | Kauffman et al. | 707/10 |
| 6,336,115 B1 * | 1/2002 | Tominaga et al. | 707/10 |
| 2002/0046232 A1 * | 4/2002 | Adams et al. | 709/200 |
| 2002/0143976 A1 * | 10/2002 | Barker et al. | 709/231 |
| 2003/0028489 A1 * | 2/2003 | Williamson | 705/59 |
| 2003/0087629 A1 * | 5/2003 | Juitt et al. | 455/411 |
| 2003/0182270 A1 * | 9/2003 | Kuno et al. | 707/3 |
| 2004/0181487 A1 * | 9/2004 | Hanson | 705/52 |
| 2004/0199604 A1 * | 10/2004 | Dobbins et al. | 709/217 |
| 2004/0236801 A1 * | 11/2004 | Borden et al. | 707/204 |
| 2006/0015574 A1 * | 1/2006 | Seed et al. | 709/219 |

* cited by examiner

*Primary Examiner*—Cheryl Lewis
(74) *Attorney, Agent, or Firm*—Marger Johnson & McCollom, P.C.

(57) ABSTRACT

An Internet-scale file sharing system includes a client-side file sharing application that allows file-sharing users to identify files to share and transmit metadata corresponding to those files to a metadata repository. A server-side application operating on the metadata repository tracks metadata received from associated file-sharing users, as well as metadata from other affiliated metadata repositories. Each metadata repository acts as a search engine for any querying users and can provide search results based on locally stored metadata alone. Each metadata repository may additionally choose to locally-store popular files from an associated file-sharing user so as to alleviate transmission burdens on that file-sharing user. Associated metadata repositories each periodically synchronize their stored metadata so that all metadata repositories may generate similar search results. In such manner, file-sharing queries need only be performed by the metadata repository receiving the query, and not by all associated metadata repositories.

20 Claims, 6 Drawing Sheets

```
<Subduction url="http://A.com/W2W">                        600
        <QueryResource/>
</Subduction>

602

Subduction url="http://B.com/W2W">

<Resource md5="MD5" location="http://B.com/download?id=2">

<Property name="fileName" value="Truisms.txt"/>

<Property name="text.firstLine"

value="An elite is inevitable"/>

</Resource>

<ResourceDeleted location="http://B.com/download?id=23"/>

<ResourceDeleted location="http://B.com/download?id=3"/>
</Subduction>
```

FIG. 6

MULTI-TIERED STRUCTURE FOR FILE SHARING BASED ON SOCIAL ROLES

FIELD OF THE INVENTION

This disclosure generally relates to computer data transfers, and in particular, it relates to multi-computer data transfers accomplished by accessing another computer's memory.

BACKGROUND OF THE INVENTION

File sharing over the Internet has become increasingly popular over the last five years. Such shared files include text files (for example, .TXT and .DOC files), image files (.TIF or .JPG formats), music files (in .MP3 or .WAV formats), multimedia files (.MPG files) and the like, in any of a variety of formats. Most such file sharing systems are promoted as peer-to-peer in that all users of the system enjoy equal standing and files are communicated directly between such users.

NAPSTER 1.0 and other popular file-sharing systems have offered centralized file-sharing functions without exploiting all potential advantages. NAPSTER metadata is sent strictly client-to-server, and in such systems, shared files are always sent peer-to-peer. In such systems, though, centralization may act as a bottleneck to information flow at certain scales.

GNUTELLA, on the other hand, is one known decentralized file-sharing system, yet has some demonstrated technical inefficiencies that allow the system to saturate at large scales. This is due to the fact that queries and shared files are always sent peer-to-peer.

Most file sharing has, to date, essentially been manually performed and file-sharing systems been implemented in technically and socially naïve ways. Most are premised on the false assumption that the majority of users may want to share as well as to receive files, but statistics have shown this not to be the case. While it has proved true that many people have information to share, comparatively few have demonstrated an interest in sharing. According to some surveys, only 20-30% of the file-sharing community actually contributes shared files. In particular, it has been shown that 1% of GNUTELLA users fulfill 50% of all search requests. In that same system, 66% of users share no files, 73% share 10 or fewer files, and 53% of those sharing files never answer search requests or all uploading.

Accordingly, there is a need for a multi-tiered structure for file sharing that addresses certain deficiencies in existing technologies.

SUMMARY OF THE INVENTION

It is an object of the present disclosure, therefore, to introduce a file sharing system wherein separate classes of file-sharing and file-downloading users are established. In such a system, users are classified based on their social role within the network. File-sharing users primarily provide shared files to the network. Metadata is generated for all shared files and transmitted to a metadata repository for centralized storage. Querying users then enter search queries to the metadata repository. If a query is received for which the shared file satisfies the query based on the stored metadata, the metadata repository transmits an identification of the shared file to the querying user for download.

In further embodiments of the disclosure, a method for facilitating file-sharing queries includes receiving metadata files from a plurality of file-sharing users, storing the metadata locally at a first metadata repository to facilitate search queries from querying users received by the first metadata repository, and periodically transmitting the stored metadata to a second metadata repository for facilitating queries from querying users receive by the second metadata repository.

In still further embodiments of the disclosure, a method for facilitating a file-sharing query includes receiving and storing metadata from a file-sharing user, receiving a plurality of search requests that are satisfied by the shared file, and uploading the shared file from the file-sharing user for local storage on the metadata repository when, for example, the plurality of search requests exceed a predetermined threshold.

BRIEF DESCRIPTION OF THE DRAWINGS

Further aspects of the present disclosure will be more readily appreciated upon review of the detailed description of its various embodiments, described below, when taken in conjunction with the accompanying drawings, of which:

FIG. 6 depicts exemplary transmission and response messages for synchronizing stored metadata in the subduction network of FIG. 1.

DETAILED DESCRIPTION OF THE SPECIFIC EMBODIMENTS

In general, the present disclosure introduces various embodiments of a multi-tiered, file-sharing schema that is globally-scalable, thereby allowing large numbers of users to provide and retrieve shared files. The disclosed system, sometimes referred to herein as a subduction network, accomplishes this without requiring each file-sharing user to host and manage a large data cache or vast bandwidth capabilities, and without them having to implement a network server, which would require a large amount of setup and infrastructure cost. The disclosed system instead leverages asymmetric user motivations and exploits observed file-sharing social phenomena that, in turn, allows for greater technical efficiencies than in previous file-sharing systems.

The various embodiments of the subduction network described herein are not strictly peer-to-peer systems and do not solely rely on centralization, which can create bottlenecks for data flow. The subduction network, instead, is centralized with respect to query submission in order to allow querying users to readily find data, but is decentralized with respect to the transmission of shared files in order to deter denial-of-service or other such attacks that commonly occur on large scale public networks. The definition of social roles within the subduction network also allows for a dynamic and efficient allocation of bandwidth and storage space therein.

In order to accommodate the wide variety of operating systems and computer hardware in the global marketplace, the subduction networks described herein employ standardized communication protocols and formats, such as hypertext transfer protocol (HTTP), transmission control protocol (TCP), user datagram protocol (UDP) and/or Internet Protocol (IP) as their transport layer. All data exchanges may use extensible mark-up language (XML) documents. Any generally accepted formats and protocols may be used, so as to allow development and interoperability of the subduction network across many applications and operating systems.

The flexible nature of the subduction network allows it to readily serve as a file-searching/sharing schema on small, large and global networks that may be public or private. For local area networks (LANs) in particular, there is no need for a dedicated central document server or inter-machine search mechanisms when a subduction network is employed.

Figure 1:
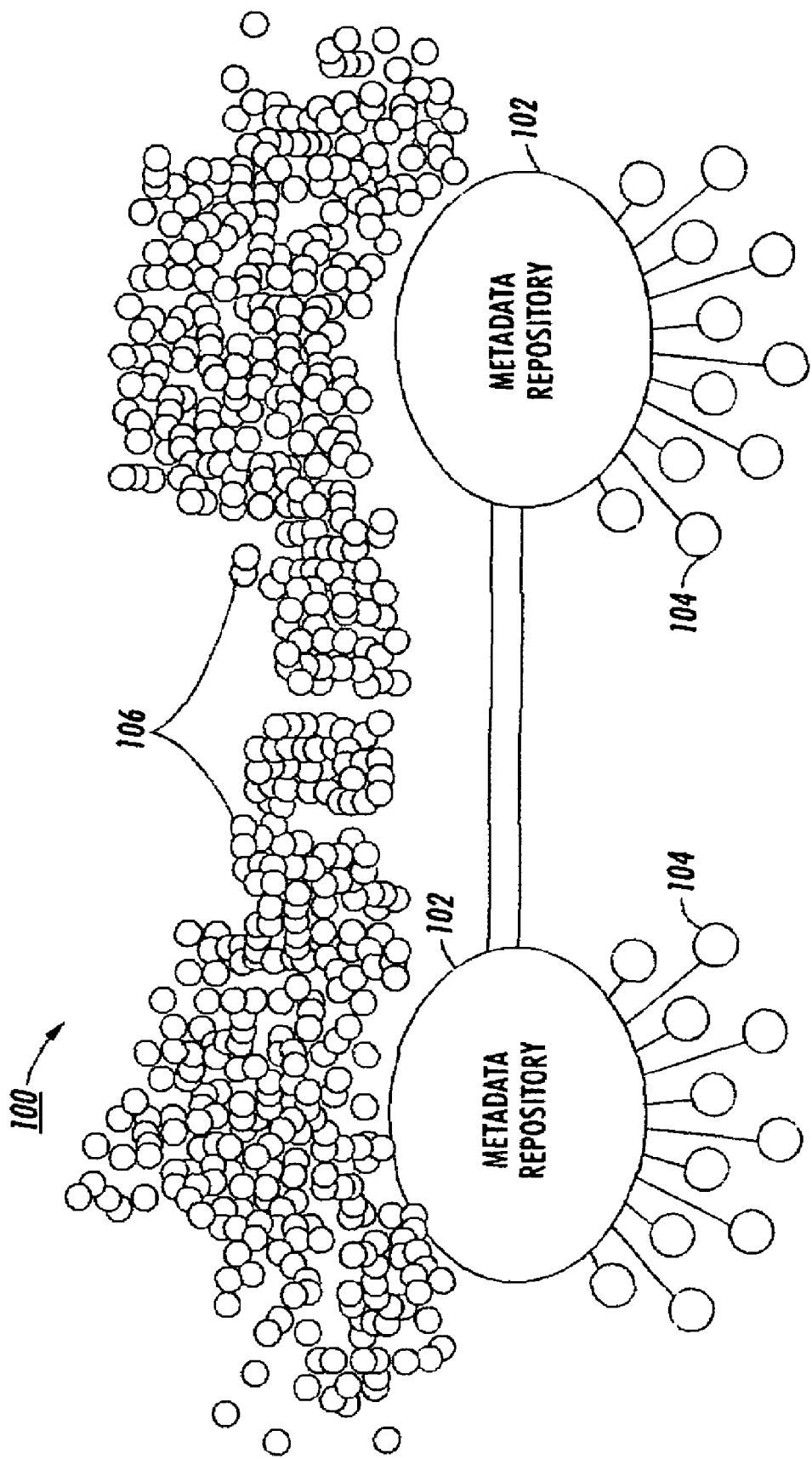
FIG. 1 is a schematic representation of an exemplary subduction network for use with the present disclosure.

Referring now to FIGS. 1-5, wherein similar components of the present disclosure are referenced in like manner, various embodiments of a subduction network 100 will be described. Turning now to FIG. 1, there is depicted one embodiment of a subduction network 100 that includes one or more metadata repositories 102, a plurality of file-sharing user terminals 104 and a plurality of querying user terminals 106. Each of these components may be a computing device, such as a personal computer, a network server, a personal digital assistant (PDA), or any other communication or computing device capable of two-way data transfers over a network in accordance with their role described herein.

By way of biological analogy, these components 102, 104 and 106 of the subduction network 100 may be analogized to the social role of "whales," "grouper fish" (or "groupers") and "pilot fish" respectively, and may sometimes be referred to as such herein. Whales may be characterized by their comparatively large data storage and bandwidth capacities. Grouper fish are the (generally smaller) file-sharing users who share their files on the subduction network 100. Pilot fish are the more numerous querying users who typically have few network resources or files to contribute and are primarily looking for shared files to download.

A subduction network 100 differs from traditional peer-to-peer, file-sharing systems in that network users are identified and classified according to their primary participation and activities within the network. No such classification takes place in existing file-sharing systems where all users are of the same class. In a subduction network 100, at least two classifications of network user are possible, namely, a first class of user that primarily shares files with the network (e.g. groupers) and a second class of user that primarily downloads shared files (e.g. pilot fish). Other classes may be delineated based on the ratio of sharing to downloading performed, or by any of a variety of similar factors.

This classification of users allows a whale or a group of whales in a subduction network 100 to allocate network resources for users in a more efficient manner than in previous systems. For example, more access bandwidth may be provided to a grouper with a large number of files to share than to a pilot fish who intermittently downloads a small number of files.

Metadata repositories 102, or whales, are the backbone of the subduction network 100. Whales operate in the subduction network 1000 to store metadata for shared files available from groupers, as well as to process search queries received from pilot fish. Whales typically are capable of providing vast storage space (for example, on the order of gigabytes or terabytes), fast processing, and large network communication bandwidth in comparison to the remaining participants of the subduction network 100. Whales are also preferably committed to providing a large number of such resources to support the network 100, and they generally remain longer term members of the network 100 than groupers or pilot fish.

Metadata repositories 102, in certain embodiments, are implemented as network servers of the type commonly manufactured by IBM or SUN. Each metadata repository 102 may provide different cache sizes and cache policies to attract various file-sharing or querying users. The metadata repositories 102 may also specialize in providing a certain type or quality of data for the same purpose. In an embodiment where whales compete amongst each other for the attention of groupers and pilot fish, each metadata repository 102 may also be rated by file-sharing and querying users as to quality of service provided.

The metadata repositories 102 may be independent or affiliated. A group of affiliated whales may sometimes be referred to herein as a "pod." In either case, the metadata repositories 102 may generally communicate with each other using an anti-entropy software protocol, described particularly hereinbelow. This protocol, sometimes referred to herein as whale-to-whale (or W2W) is used to synchronize stored metadata information to create a stable index of available shared files available from any of the metadata repositories. Whales may communicate in a parallel, pairwise manner that does not consume egregious amounts of bandwidth, and yet keeps other whales sufficiently apprised of new or updated metadata. This allows each whale to provide similar search results. W2W may be implemented by JAVA 2 ENTERPRISE EDITION (J2EE), as web server plug-in or a standalone operating system (OS) service. Whales may determine trustworthiness and reliability of other whales over time and trusted whales may be given greater priority in this pairwise updating scheme. There may be several record authorities within a pod that remain synchronized so that a query can be similarly handled by any of the whales in the pod.

Whales periodically query other whales in pod and act as metadata replicas, with each whale maintaining a version of the entire pod's metadata. W2W may include an XML over HTTP protocol that allows other metadata repositories to periodically query other whales for metadata changes. Metadata movement may be pairwise between whales, with each whale only transmitting the metadata for files shared by their associated groupers. Connections may be pairwise and parallel so that any whale can query any other whale in the pod at any time. Pod membership is stored by every whale in the pod.

A second protocol allows whales to communicate with groupers, and is sometimes referred to herein as whale-to-grouper (or W2G). W2G may be provided by whales as a client-side application that can be downloaded to file-sharing users 104. In alternate embodiments, G2W may be deployed as an Internet front-end of a whale via a web browser, or as a web server with appropriate software components.

The client-side application allows groupers to choose files to share and to generate/communicate metadata about those files to a whale. The metadata may include information such as file size, hash (i.e. MD5, SHA), and a uniform resource locator (URL) or other network address. The metadata may also various file properties, such as image width, bit rate of encoding, and the like. G2W could be implemented as an operating system (OS) service or as a stand-alone application. An XML over HTTP protocol may be used to periodically encapsulate grouper state and metadata changes since a previous transaction between the grouper and the metadata repository. Whales, in turn, store received metadata and act as data caches for associated groupers. Whales may also track each grouper's available network resources, such as storage capacity and maximum available bandwidth.

In certain embodiments, groupers are always associated directly with or dedicated to a particular whale, by subscription or the like. That is, each grouper provides its metadata to one whale only. A grouper may receive some kind of credit for associating with a particular whale, such as by an acknowledgement of the grouper by name, payments to the grouper, or the grouper may be rewarded with extra access bandwidth and data storage space. Whales may compete for grouper associations on the basis of these or other terms.

Whales also act as web-based search engines for the stored metadata to querying users. These pilot fish may interact with a whale via a user interface (UI) that allows them to enter a search request for available shared files. Other manners of communication than a UI may be used.

Pilot fish are generally motivated by self-interest and will naturally gravitate to whales that provide the best query results or provides results the fastest. Whales may compete for the attention of pilot fish on these qualities, or in any of a variety of additional manners, such as by providing individual stylized, or otherwise improved UIs.

In certain embodiments, pilot fish may be charged based on file size for any files downloaded, or may otherwise subscribe and make payments to a whale. Whales, in turn, may kick back part of any received payments to the groupers that provided the downloaded files. Whales may compete with each other on the basis of these terms as well.

Figure 2:
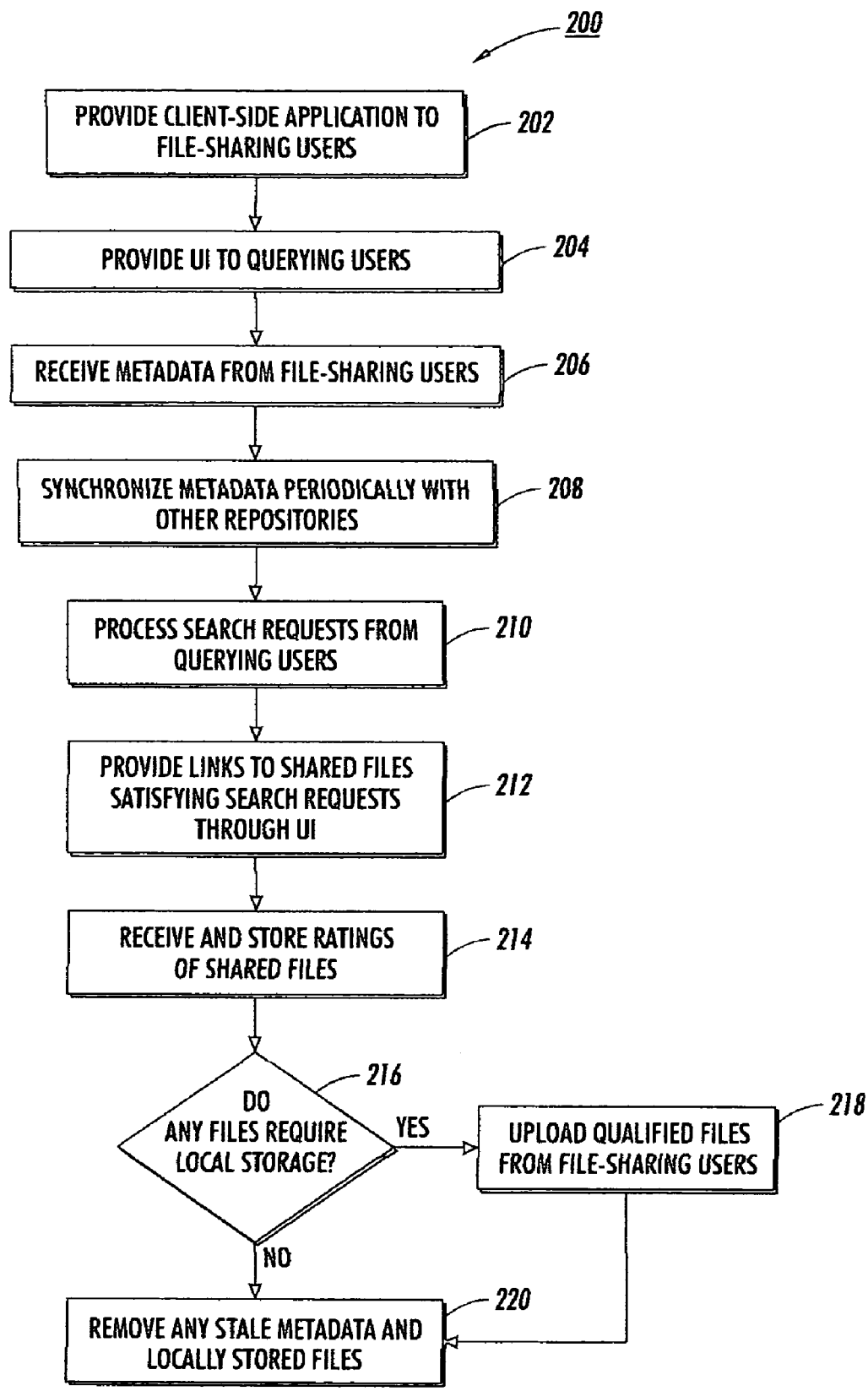
FIG. 2 is a flowchart depicting an exemplary file-sharing method performed by a metadata repository of FIG. 1.

Turning now to FIG. 2, therein is depicted an exemplary method 200 for operating a subduction network 100. The steps described herein may be performed continuously in a dynamic network, and need not be performed in the precise order in which they are described. By the method 200, a metadata repository 102 provides a client-side application to a plurality of file-sharing users (step 202). The client-side application may also be provided to file-sharing users in other manners or be obtained from other sources.

Figure 4:
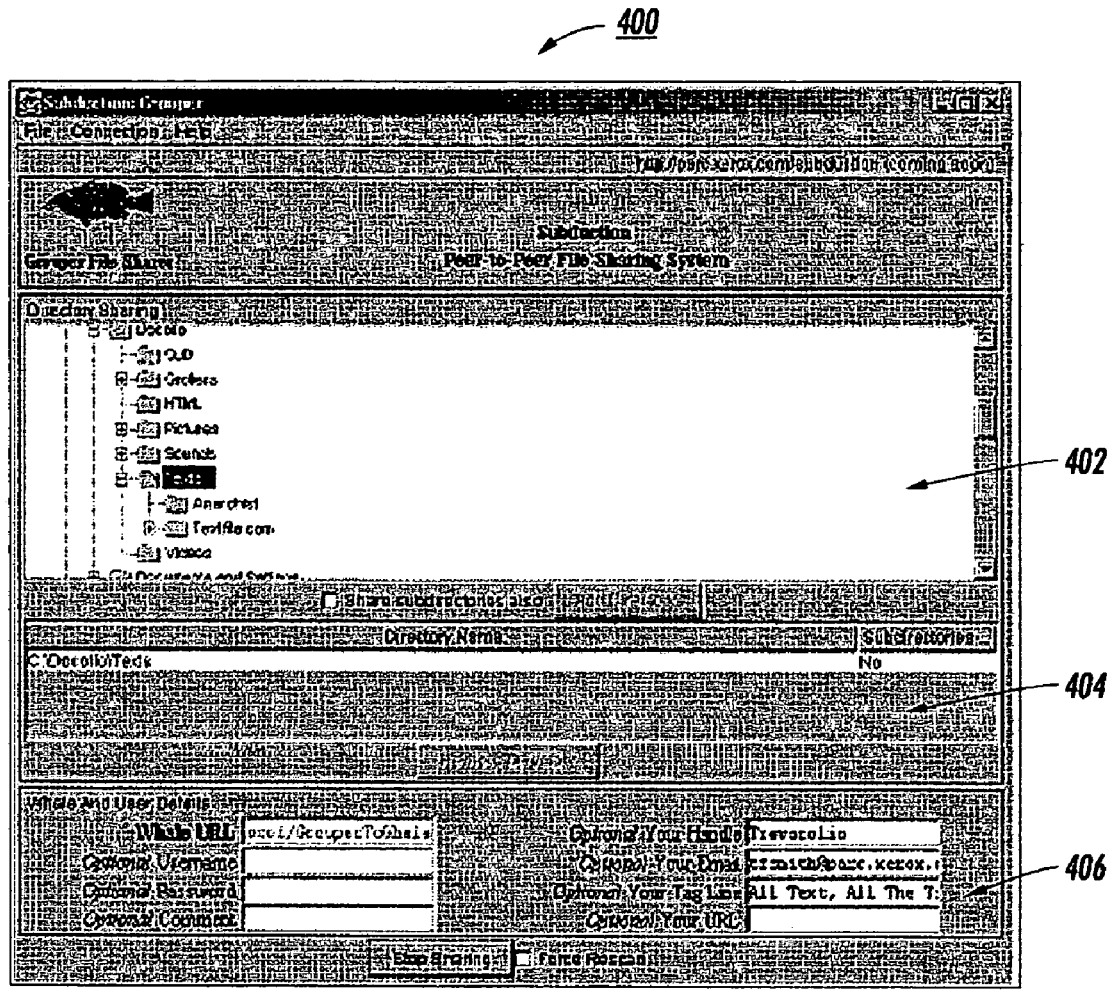
FIG. 4 is a depiction of an exemplary interface provided by a client-side application to a file-sharing user.

FIG. 4 shows an exemplary interface 400 presented by the client-side application to a file-sharing user. The interface 400 may include a file directory window 402 for displaying a file-sharing user's locally-stored files, a shared file directory window 404 for displaying those locally-stored files being shared. The interface 400 may also include a plurality of login fields 406 for logging into, and thus being recognized by, an associated whale.

Figure 5:
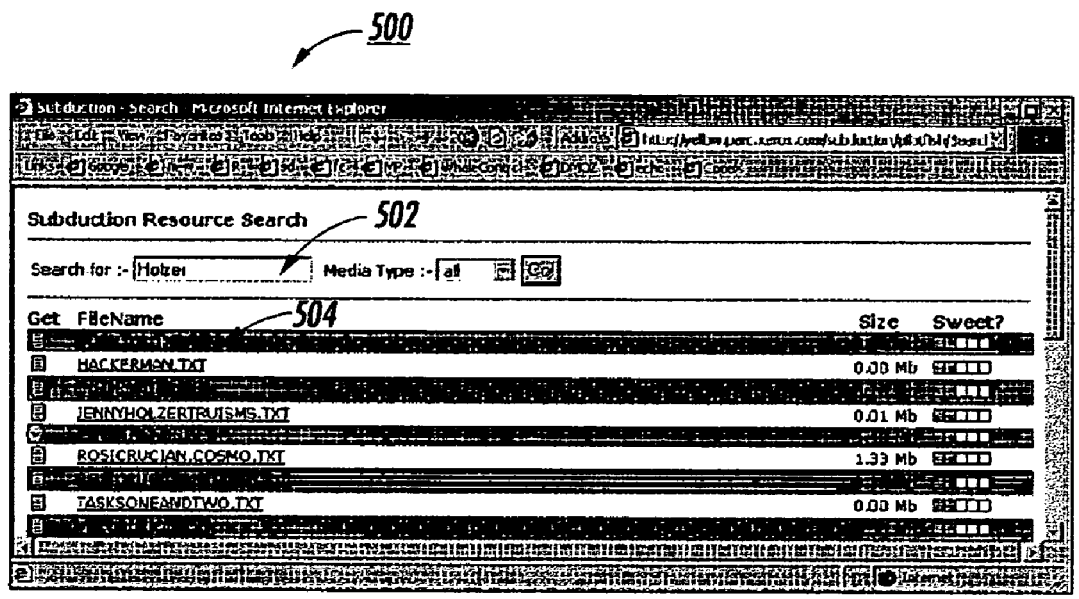
FIG. 5 is a depiction of an exemplary user interface provided to a querying user.

The method 200 further includes providing a UI to querying users 106 that allows them to enter searches and queries for available shared files (step 204). FIG. 5 shows one exemplary UI presented to querying users 106 that includes a search field 502 for entering a query, and a search results window 504 for presenting hyperlinks or other identification of shared files that match a submitted query. The UI may include any of a variety of additional textual and/or graphic information, including advertisements and the like.

The method 200 further includes receiving metadata from file-sharing users (step 206). As described previously, the metadata may include editor/authorship, image thumbnails, ID3 tags and other information. The client-side application generates metadata in a manner similar to that of known abstracting programs, such as those that provide author and title information for .MP3 files and the like. The metadata may also be supplemented manually by having a file-sharing user submit keywords that describe the shared file.

The method 200 further provides that a whale synchronize its stored metadata periodically with other metadata repositories (step 208). As described previously, a pairwise protocol may be used to allow whales to exchange stored metadata and other information about themselves or associated users. A transmission of metadata between whales may be accomplished using the exemplary submission of metadata 600 and a response 602 as shown in FIG. 6.

In a network embodiment where whales are competitive, whales may choose not to share any identification of the groupers that have submitted shared files with other whales, in order to retain associated groupers for themselves. The method 200 further allows whales to process search requests from querying users (step 210). In a subduction network 100, unlike certain other existing systems, each search is processed locally and the query is not passed on to other whales. This is made possible by local storage of all pod metadata by each whale. After the search has been processed, however, any files satisfying the search results may then be retrieved from any whale, not necessarily the one that processed the search.

The method 200 further allows whales to provide links to shared files satisfying search requests through a UI (step 212) and further allows the whale to receive and store ratings of shared files provided by querying users (step 214).

Returning to the method 200, a whale may periodically check whether any shared files require local storage (step 216). When there are qualified files to upload, the method 200 includes uploading qualified files from file-sharing users (step 218).

Metadata may be cached according to a cache policy particular to the whale. For example, a null cache policy would allow all shared files to be uploaded from groupers. A fixed cache policy would allow groupers to upload certain files to an associated whale based on certain criteria of the shared files. Thus, if a file has been requested a threshold number of times, or requested a number of times in a predetermined time period, the whale may upload and store the file itself for direct distribution in order to avoid undue grouper (to whale) bandwidth consumption. Other criteria may be used to determine file uploads. For example, whales may only store certain types of data or data from file-sharers of a particular rating only. The cache policy may be implemented in accordance with known least-recently used (LRU) schemes, or in any other useful manner.

Finally, according to the method 200, a whale may periodically remove any stale metadata and stale local files from storage (step 220).

Figure 3:
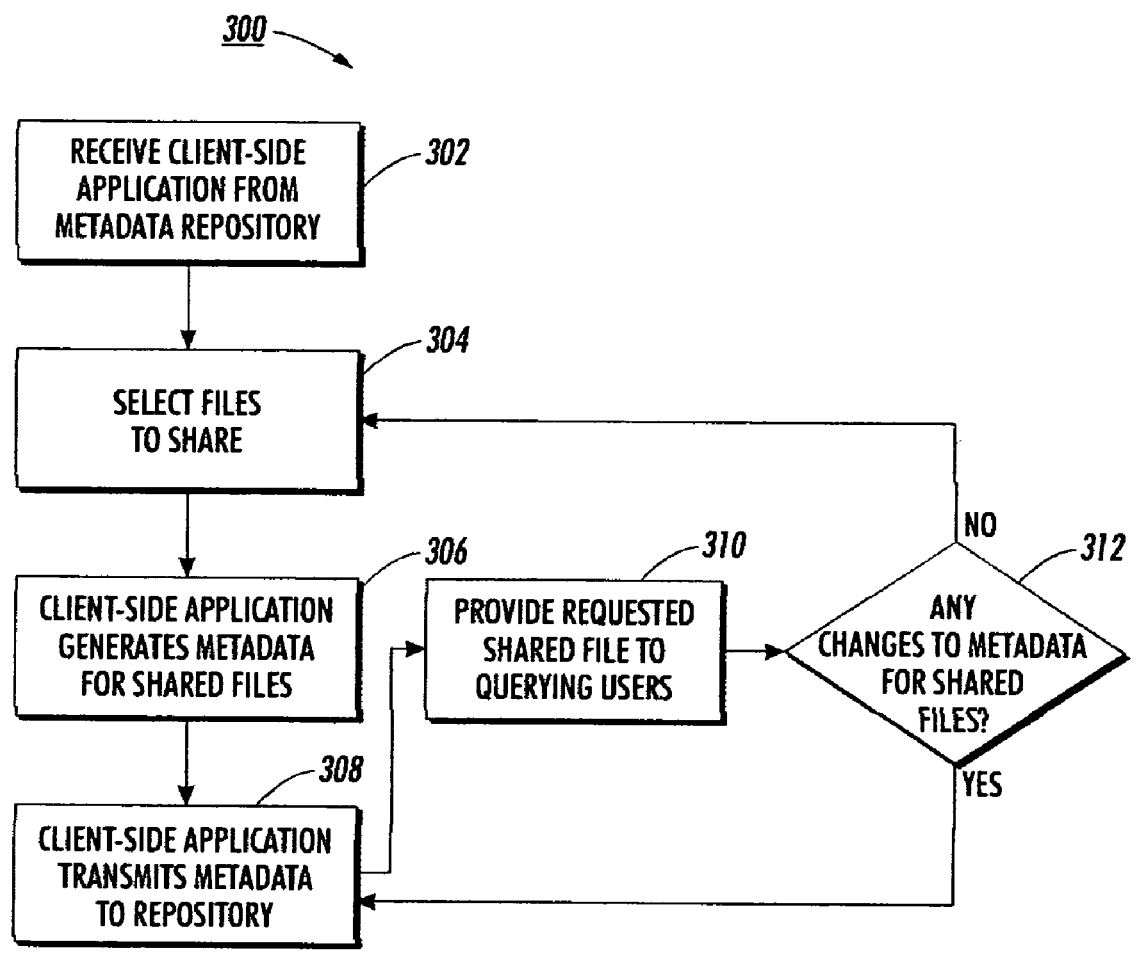
FIG. 3 is a flowchart depicting an exemplary file-sharing method performed by a file-sharing terminal of FIG. 1.

Turning now to FIG. 3, therein is an exemplary method 300 for file-sharing performed by a grouper. The method 300 commences when a grouper receives the client-side application from a whale. This step 302 need only be performed once by a grouper upon the groupers first access of the subduction network 100. The remaining steps of the method 300 may be performed by a grouper in any order, or a grouper may perform only certain steps in a session with a whale.

The method 300 allows a grouper to select files to share (step 304). In response to a selection of one or more files, the client-side application then generates metadata for shared files (step 306) and transmits the metadata to a metadata repository (step 308). In the subduction network 100, once a shared file has been selected by a pilot fish, the groupers may provide requested shared files directly to the pilot fish (step 310) or may instead upload shared files to a whale if the whale allows or requests it, based on the aforementioned cache criteria.

Finally, the method 300 provides that a grouper submit any changes, deletions or updates to metadata for locally-stored shared files (step 312). If there are no changes, no action is taken. But if there are changes to the grouper's metadata, such updated metadata is communicated to an associated whale as in step 308 above.

Simulations of a subduction network as described in the foregoing have been performed. In particular, a simulated subduction network included 10 whales, each with 10,000 initial records and a 128 kilobyte/second connection between whales. Metadata update was performed at a frequency of 1 second using serial updating. As a result, metadata synchronization among the pod occurred in approximately 400 seconds. This time decreases to under 50 seconds where whales have 1000 records or less.

The subduction network 100 described herein may include various copyright protection elements so that copyrighted material is not illegally exchanged. The system may detect and block copyrighted information identified from submitted metadata information, or may arrange to pay copyright holders for copyrighted works that have been shared. A digital property rights management (DPRM) system may be provided for enforcement purposes.

Although the best methodologies of the invention have been particularly described in the foregoing disclosure, it is to be understood that such descriptions have been provided for purposes of illustration only, and that other variations both in form and in detail can be made thereupon by those skilled in the art without departing from the spirit and scope of the present invention, which is defined first and foremost by the appended claims.

What is claimed is:

1. A method for fulfilling a file-sharing query, comprising:
    allocating bandwidth to a file-sharing user at a first level, wherein the first level is based upon a number of files the file-sharing user has to share;
    transmitting a client-side application to the file-sharing user having a shared file, the client-side application for generating metadata corresponding to the shared file;
    receiving and storing the metadata from the file-sharing user;
    providing a user interface (UI) to a querying user, the UI for entering a query to a metadata repository;
    receiving a query from the querying user via the UI, the shared file satisfying the query based on the stored metadata; and
    transmitting an identification of the shared file to the querying user, wherein bandwidth is allocated to the querying user at a second level lower than a first level.

2. The method of claim 1, further comprising:
    periodically receiving and storing updated metadata from the client-side application.

3. The method of claim 1, said client-side application generating the metadata using an abstracting program.

4. The method of claim 1, said UI comprising a proprietary UI of the metadata repository.

5. The method of claim 1, said transmitting an identification further comprising: transmitting a hyperlink to the querying user in response to the query, wherein a selection of the hyperlink by the querying user initiates a transmission of the shared file from the me-sharing user to the querying user.

6. The method of claim 1, further comprising:
    storing the shared file locally based on a characteristic of the shared file.

7. The method of claim 6, said transmitting an identification further comprising:
    transmitting a hyperlink to the querying user in response to the query, wherein a selection of the hyperlink by the querying user initiates a transmission of the shared file from the metadata repository to the querying user.

8. The method of claim 6, the characteristic comprising a threshold popularity of the shared file.

9. The method of claim 6, wherein the metadata is transmitted to at least one other metadata repository for storage and the shared file is not transmitted to any other metadata repository for storage.

10. The method of claim 1, further comprising:
    receiving updated metadata for storage; and
    transmitting the updated metadata to at least one other associated metadata repository to facilitate queries directed to the at least one other associated metadata repository.

11. The method of claim 10, said transmitting the updated metadata further comprising:
    transmitting the updated metadata in a parallel, pairwise protocol with the at least one other metadata repository.

12. The method of claim 1, further comprising:
    periodically receiving updated metadata from a second metadata repository.

13. The method of claim 1, further comprising:
    providing a payment to the file-sharing user for the shared file transmitted to the querying user.

14. The method of claim 13, further comprising:
    receiving a payment from the querying user for the shared file.

15. A method for facilitating file-sharing queries, comprising:
    receiving metadata files from a plurality of file-sharing users, the metadata files corresponding to shared files, wherein bandwidth is allocated to the file-sharing users at a first level and the first level depends upon a number of files the file-sharing users have to share;
    storing the metadata locally at a first metadata repository to facilitate search queries from querying users received by the first metadata repository, wherein bandwidth is allocated to querying users at a second level;
    uploading a shared file from a file-sharing user for local storage on a metadata repository when a plurality of search requests for the shared file exceed a predetermined threshold; and
    periodically synchronizing stored metadata with a second metadata repository for facilitating queries from querying users received by the first and second metadata repositories.

16. The method of claim 15, wherein the queries received by the metadata repository are not transmitted to the second metadata repository and queries received by the second metadata repository are not transmitted to the first metadata repository.

17. The method of claim 15, further comprising:
    transmitting a client-side application to a file-sharing user having the shared file, the client-side application for generating metadata corresponding to the shared file.

18. The method of claim 15, further comprising:
    receiving a query from a querying user; and
    transmitting an identification of a shared file satisfying the query to the querying user.

19. A method for operating an asymmetric data sharing network, comprising:
    establishing at least two classes of users that interact with a metadata repository over a network, the at least two classes including a sharing class that primarily provides data and a searching class that primarily searches for data and higher levels of network resources are allocated to the sharing class than allocated to the searching class;
    receiving metadata identifying a shared file from a user in the sharing class; and
    receiving a query from a user in the searching class, the metadata satisfying the query; and
    providing an identification of the shared file to the user in the searching class.

20. The method of claim 19, further comprising:
    uploading the shared file from the user in the sharing class for distribution to users in the searching class when the shared file satisfies a predetermined condition.

* * * * *